US011777435B1

(12) United States Patent
Sun et al.

(10) Patent No.: US 11,777,435 B1
(45) Date of Patent: Oct. 3, 2023

(54) SMOOTH TRANSITION CONTROL BETWEEN OVERMODULATION AND SIX STEP PULSE WIDTH MODULATION

(71) Applicant: BorgWarner Inc., Auburn Hills, MI (US)

(72) Inventors: Yang Sun, Noblesville, IN (US); Caleb Secrest, Noblesville, IN (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/663,733

(22) Filed: May 17, 2022

(51) Int. Cl.
*H02P 27/08* (2006.01)
*H02P 23/14* (2006.01)

(52) U.S. Cl.
CPC .............. *H02P 27/08* (2013.01); *H02P 23/14* (2013.01)

(58) Field of Classification Search
CPC .......... H02P 27/00; H02P 27/04; H02P 27/06; H02P 27/08; H02P 27/085; H02P 29/00; H02P 29/032; H02P 21/00; H02P 21/0003; H02P 21/0021; H02P 21/0085; H02P 21/04; H02P 21/14; H02P 21/22; H02P 23/00; H02P 23/0027; H02P 23/07; H02P 23/14; H02P 23/28; H02P 25/00; H02P 25/062; H02P 25/064; H02P 7/00; H02P 7/29; H02P 6/00; H02P 6/08; H02P 6/06; H02P 6/12; H02P 6/28; H02P 1/00; H02P 1/04; H02P 1/24; H02P 1/42; H02P 1/46; H02P 1/423
See application file for complete search history.

(56) References Cited

U.S. PATENT DOCUMENTS 8,446,117 B2 * 5/2013 Gallegos-Lopez ..... H02P 25/22
                                                            318/400.29
9,419,549 B2   8/2016 Yim et al.

OTHER PUBLICATIONS

Lee, Dong-Choon, and G-Myoung Lee. "A novel overmodulation technique for space-vector PWM inverters." IEEE transactions on Power Electronics 13.6 (1998): 1144-1151.
Bae, Bon-Ho, and Seung-Ki Sul. "A compensation method for time delay of full-digital synchronous frame current regulator of PWM AC drives." IEEE Transactions on Industry Applications 39.3 (2003): 802-810.

* cited by examiner

*Primary Examiner* — Antony M Paul
(74) *Attorney, Agent, or Firm* — Maginot, Moore & Beck, LLP

(57) ABSTRACT

A method is provided for producing a smooth transition between overmodulation and six-step operation of a SVPWM-controlled 3-phase electric machine. In one aspect, the method predicts the PWM sample for which the control voltage vector will cross the middle of each SVPWM hexagon sector. Then, based on the current voltage angle and duty cycle, as well as on an estimated future voltage angle and duty cycle, an average duty cycle is calculated and inserted. In addition, a PWM carrier waveform is selected to ensure the PWM pulses applied to each period result in continuous switching states.

20 Claims, 12 Drawing Sheets

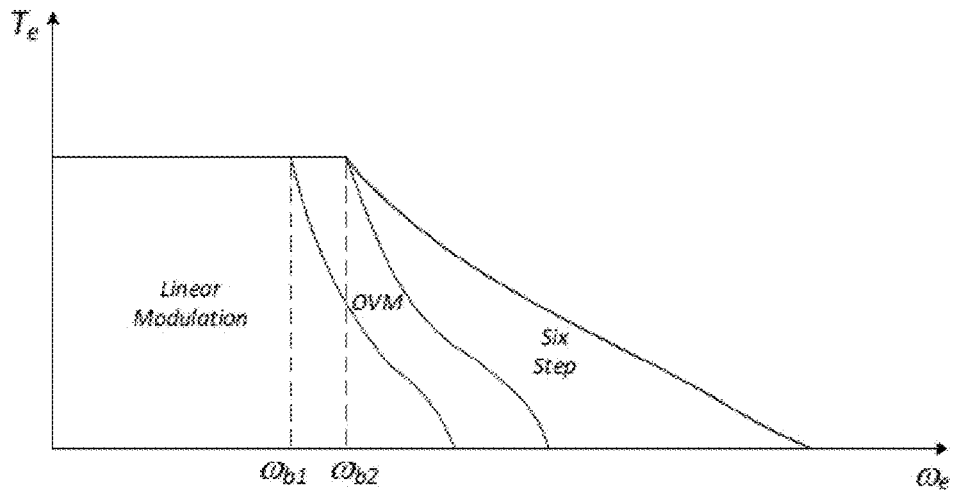
Fig. 1. Motor drive system operating regions
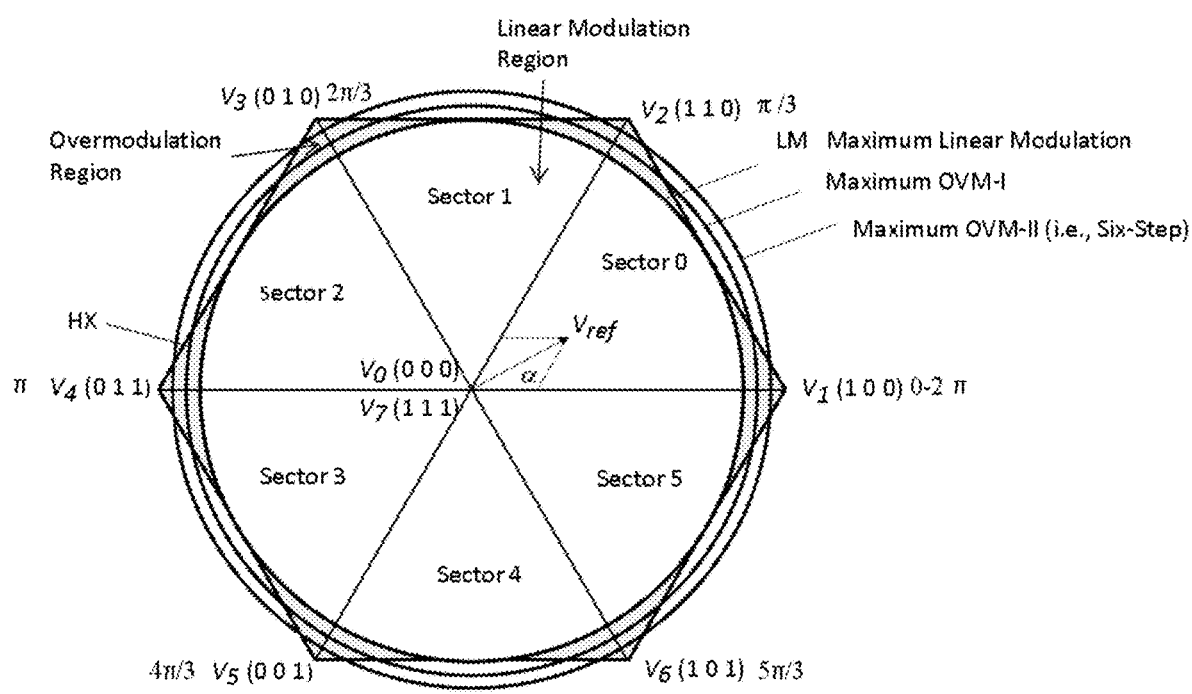
Fig. 2 PWM Voltage Hexagon

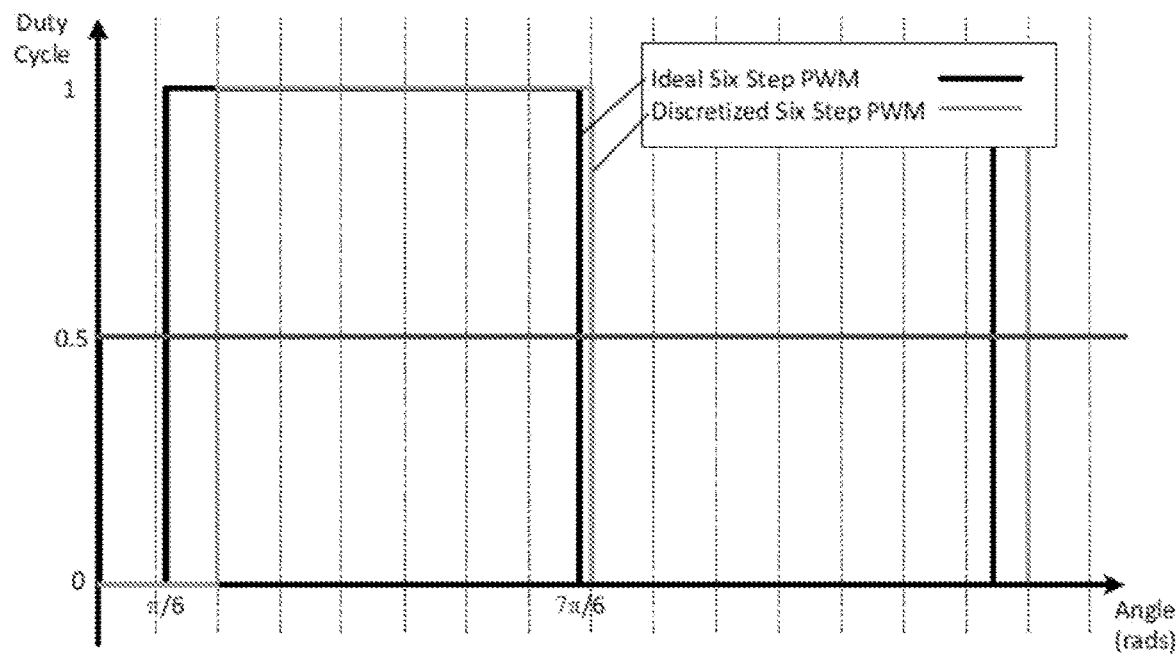
Fig. 3. Phase B Six-step Control Voltage Waveform (Prior art)
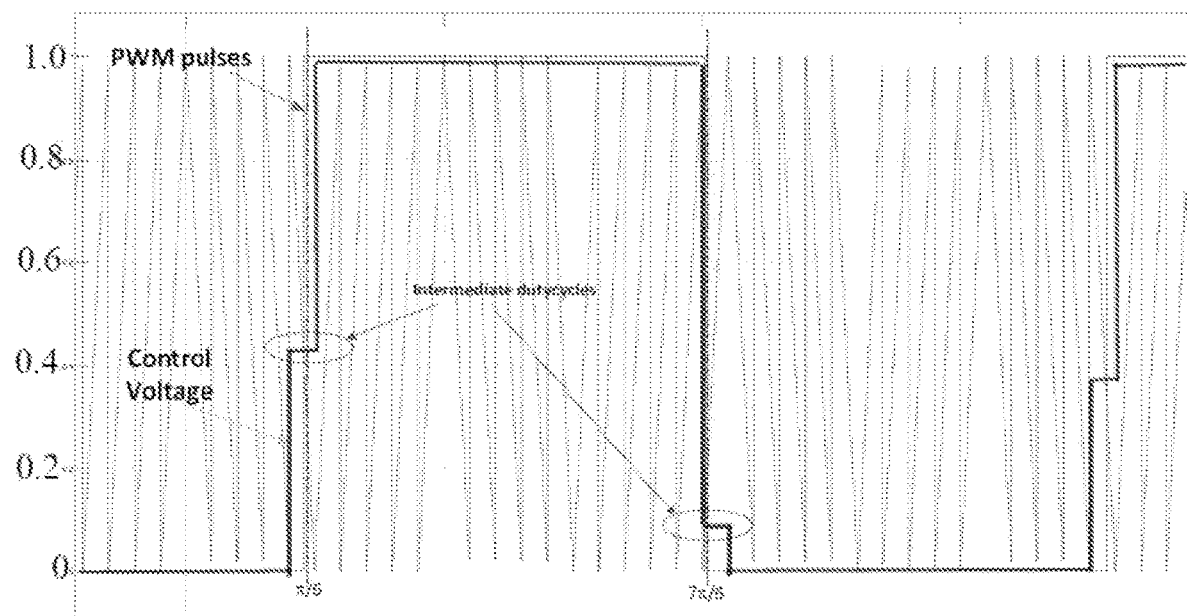
Fig. 4. Six-step PWM based on intermediate duty cycle insertion (Prior art)

Phase B OVM-II Control Voltage Waveform

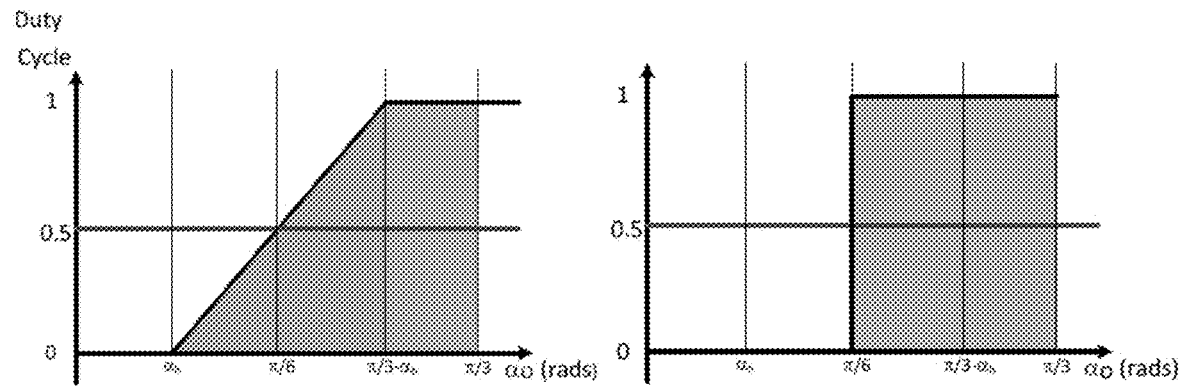
FIG. 6A
OVM II
FIG. 6B
Six Step
Ideal Phase B OVM Control Voltage Waveform in Sector 0
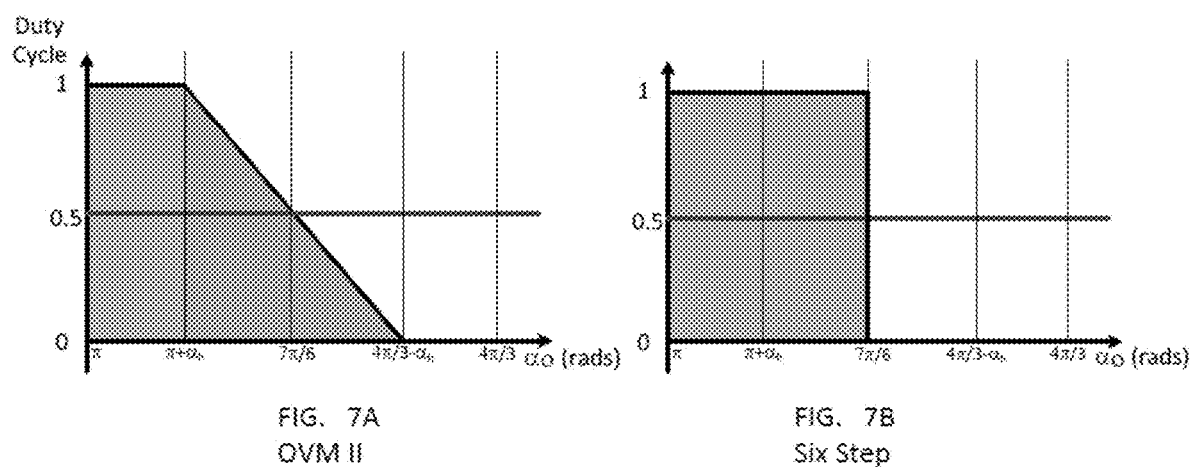
FIG. 7A
OVM II
FIG. 7B
Six Step
Ideal Phase B OVM Control Voltage Waveform in Sector 3

PWM Carrier Type Determination

Current response of closed loop simulation
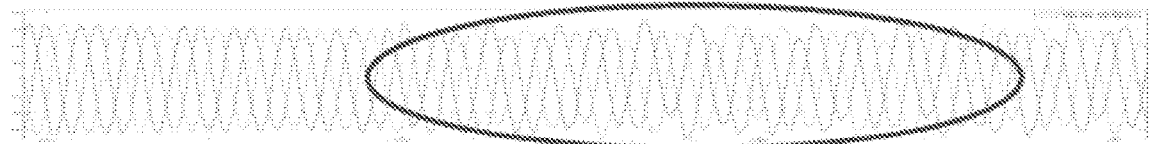
FIG. 14A  OVM to Six-Step without duty cycle modification   (Prior art)
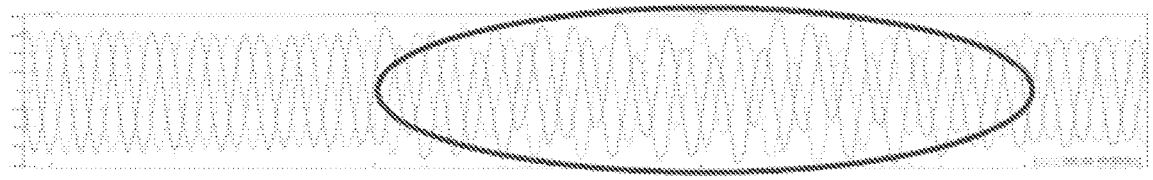
FIG. 14B  OVM to Six-Step with intermediate duty cycle modification of '549 Patent]  (Prior art)
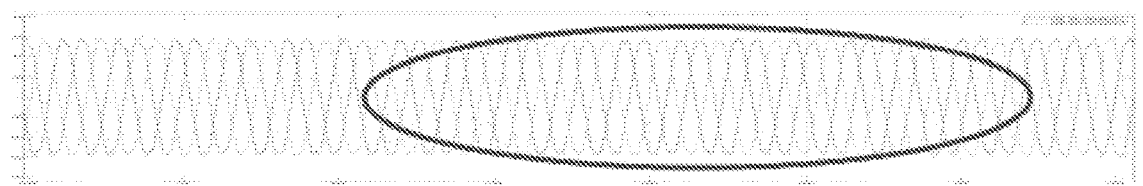
FIG. 14C  Disclosed method
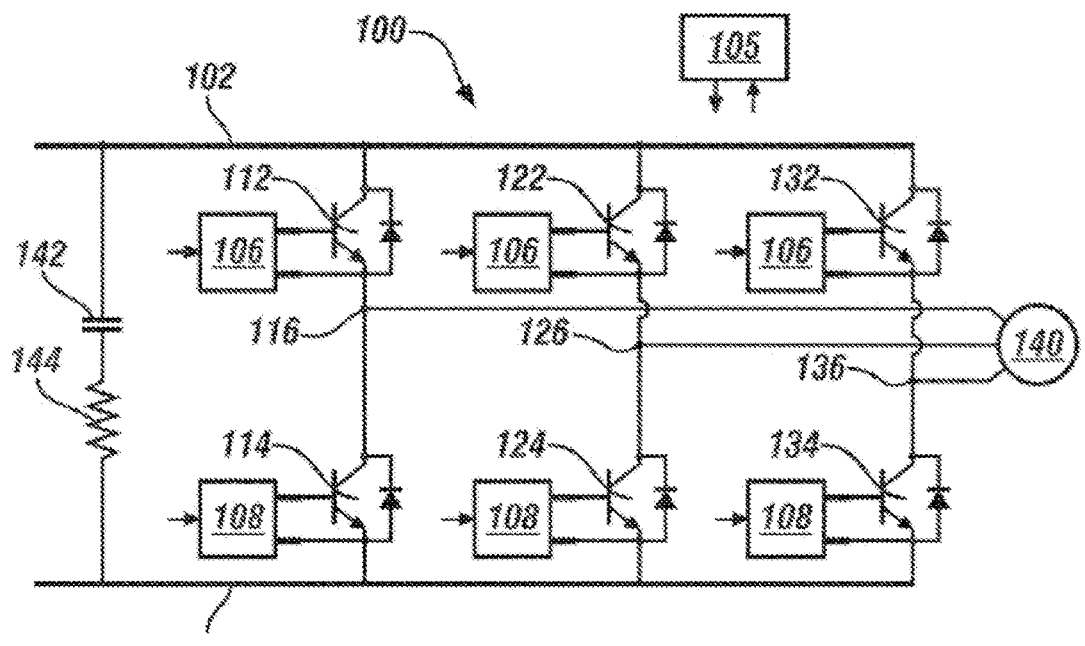
FIG. 15

SMOOTH TRANSITION CONTROL BETWEEN OVERMODULATION AND SIX STEP PULSE WIDTH MODULATION

FIELD

This disclosure relates to the field of controlling electric motors in an electric motor drive system. More particularly, this disclosure relates to systems and methods for controlling an electric motor between six step pulse width modulation operation and overmodulation operation.

BACKGROUND

Control of AC motor/generators, such as three-phase permanent magnet synchronous electric motors (electric machines) is accomplished using a three-phase pulse width modulated (PWM) inverter. A PWM inverter can be controlled in several different operation modes, including, e.g., a space vector PWM (SVPWM) mode and a six-step mode. The drive system often includes a voltage source inverter (VSI) to convert a DC voltage signal into a three-phase signal to drive the synchronous motor.

An exemplary system, schematically illustrated in FIG. 15, includes a VSI 100 electrically operatively connected between a DC bus and a multi-phase AC electric motor/generator (electric machine) 140. A controller 105 includes a computing device, which includes a computer or a microprocessor configured and operable to execute software commands and programs, and which can include associated firmware, such that the controller is configured and operable to control the VSI 100 as a multi-phase Pulse-Width Modulation (PWM) inverter circuit. The electric machine 140 can be a permanent magnet synchronous device, an induction machine or the like. The inverter 100 electrically connects to a high-voltage DC power source via a positive high-voltage DC power bus (HV+) 102 and a negative high-voltage DC power bus (HV−) 104. The high-voltage DC power source can include a high voltage electrical energy storage device, e.g., a high-voltage battery or a capacitor, a high-voltage electric power generator or another related device or system. A bus capacitor 142 and resister 144 can be included for noise suppression, load balancing and the like. The inverter 100 includes a plurality of switch pairs 112 and 114, 122 and 124, and 132 and 134 electrically connecting in series between HV+ 102 and HV− 104. Each of the switch pairs corresponds to a phase of the electric machine 140, with each of the first switches connecting in series with the corresponding second switch at a node. Specifically, switch pairs 112 and 114 connect in series at node 116 to form a first arm of the inverter 100, switch pairs 122 and 124 connect in series at node 126 to form a second arm of the inverter 100 and switch pairs 132 and 134 connect in series at node 136 to form a third arm of the inverter 100. The nodes 116, 126 and 136 electrically connect to nominal first, second and third phases of the electric machine 140 to transfer electric power thereto.

A first gate drive circuit 106 controls activation and deactivation of the first, high-side switches 112, 122 and 132 and a second gate drive circuit 108 controls activation and deactivation of the second, low-side switches 114, 124 and 134. The first and second gate drive circuits 106, 108 include any suitable electronic device capable of activating and deactivating the switches 112 and 114, 122 and 124, and 132 and 134 to effect power transfer between one of HV+ 102 and HV− 104 and a phase of the electric machine 140 in response to control signals originating at controller 105. The controller 105 generates control signals that are communicated to the first and second gate drive circuits 106, 108 to activate and deactivate the switches 112 and 114, 122 and 124, and 132 and 134 in response to an inverter switch control mode.

Each of the first switches 112, 122 and 132 and second switches 114, 124 and 134 can be controlled to either an ON state or an OFF state. Each of the arms formed by the switch pairs 112 and 114, 122 and 124, and 132 and 134 can be controlled to a control state of 1 or 0. A control state of 1 for one of the arms corresponds to activation of one of the first switches 112, 122 and 132 with a corresponding second switch 114, 124 or 134, respectively, deactivated. A control state of 0 for one of the arms corresponds to activation of one of the second switches 114, 124 and 134 with corresponding first switch 112, 122 or 132, respectively, deactivated. Each of the first switches 112, 122 and 132 is preferably configured as a normally-OFF switch, meaning that the switch conducts electrical current only when activated by the first gate drive 106. In one example, the first switches 112, 122 and 132 are Insulated Gate Bipolar Transistors (IGBTs) each having a diode arranged in parallel. The first gate drive 106 activates each of the first switches 112, 122 and 132 to effect current flow thereacross responsive to the selected inverter switch control mode. Each of the second switches 114, 124 and 134 is typically configured as a normally-OFF switch, meaning that the switch conducts electrical current only when activated by the second gate drive 108. The second switches 114, 124 and 134 may be any kind of normally-OFF semiconductor switch, including, e.g., IGBT switches each having a diode arranged in parallel. During operation, the first and second gate drive circuits 106, 108 generate activation signals to activate and deactivate the first switches 112, 122 and 132 and the second switches 114,124 and 134 to operate the electric machine 140 to generate torque. The inverter 100 electrically operatively connects to the electric machine 140 in that the action of selectively activating and deactivating switches 112 and 114, 122 and 124, and 132 and 134 to effect power transfer between one of HV+ 102 and HV− 104 and a phase of the multi-phase electric machine 140 in response to control signals originating at controller 105 induces a magnetic field in an element of a stator of the electric machine 140 that acts on an element of the rotor to urge movement of the rotor within the stator, thus inducing torque in a shaft member mechanically coupled to the rotor.

The controller 105 monitors signal inputs from sensors, such as a rotational position sensor and voltage and/or current sensors, and selectively controls operation of the inverter 100 in a mode, such as a PWM mode or a six-step mode, in response to a torque or speed command. In the PWM mode, the inverter 100 switches rapidly among two of the non-zero states and one or two of the zero states. The controller 105 specifies what fraction of the time is spent in each of the three states by specifying PWM duty cycles. The controller 105 updates the PWM duty cycles at regular intervals such that the frequency of updates is significantly higher than the frequency of the rotor rotation. In the six-step mode, the inverter 100 cycles through the six non-zero states once per cycle of the rotor of the electric machine 140 to produce an AC voltage and current in each winding of the stator. The amplitude of the AC voltage is dictated by the magnitude of DC voltage on the high-voltage DC bus that electrically connects a high voltage electric power source to the inverter 100. The torque is dictated by the DC voltage, the rotor speed, and the phase difference between these quasi-sinusoidal AC voltage signals and the rotor position, and is further controlled by operating the control system in six-step mode. The controller 105 issues commands to the inverter 100 indicating when to switch to the next state in the sequence. The six-step mode is an operating mode of the inverter 100 that includes cycling the inverter 100 through the six non-zero states once per cycle of the rotor of the electric machine 140 to produce an AC voltage and current in each winding of the stator.

To increase the overall efficiency and peak power, the electric motor drive system is often required to operate in the six-step pulse width modulation (PWM) mode. Magnitude of the output voltage from a VSI at its fundamental frequency reaches its maximum only when the inverter operates in the six-step mode. Due to this voltage magnitude characteristic, operation in the six-step mode can increase torque capability of an electric machine. The overall operation region for an exemplary drive system is depicted as in the speed-torque graph of FIG. 1. When the electric speed ωe is lower than a first base speed wb1, the system is in a linear modulation region. Between wb1 and a second base speed wb2, the system is in an overmodulation (OVM) region. At speeds ωe above wb2 the system is in a six-step region. To achieve six-step PWM, a smooth transition from linear modulation, through OVM, and into six-step is necessary. There is a need for a system and method that achieves this smooth transition, and specifically a smooth transition from OVM to six-step PWM motor control.

Conventional OVM to Six-Step PWM Control

As is known in the art, the VSI operates within an inverter voltage limit, as represented by the hexagon HX in FIG. 2. In space vector PWM (SVPWM), the control voltage Vref rotates within a circle inscribed within the inverter voltage limit hexagon, as represented by the inner circle LM in FIG. 2. The region within this inner circle LM is the linear modulation region of the motor control in which the SVPWM generates sinusoidal output voltages. Outside this circle LM, the voltage waveform of the VSI is distorted. In order to increase the applied fundamental control voltage, the system must enter the OVM region, represented in FIG. 2 by the shaded spaces between the vertices of the voltage limit hexagon HX and the inner circle LM. Conventionally, OVM is achieved using the methods described in "A novel overmodulation technique for space-vector PWM inverters", D. Lee and G. Lee, IEEE Transactions on Power Electronics, vol. 13, no. 6, pp. 1144-1151, November 1998 (hereinafter referred to as "Lee & Lee"), the entire disclosure of which is expressly incorporated herein by reference. As detailed in Lee & Lee, the OVM region can be divided into two subregions based on modulation index (MI) determined by a voltage demand set by the motor controller. The modulation index is defined in Equation (1) as:

$$MI = V^* / \left(\frac{2}{\pi} Vdc\right) \tag{1}$$

where V* is the fundamental control voltage, or phase voltage reference, and Vdc is the DC bus voltage.

The MI increases as the voltage demand, or fundamental control voltage, increases. The first subregion, OVM-I, is defined as the region in which the MI is between π/(2×√3) =0.907 and √3×ln(√3)=0.952. In this region, the control voltage circle, as represented by the circle OVM-I, is larger in diameter than the linear modulation limit hexagon HX such that the circle OVM-I will intersect the edges of the hexagon at twelve points around its circumference. At operating points in which the control voltage is outside of the hexagon, the voltage is clamped to the respective hexagon edge without manipulating the phase of the control voltage. When the MI reaches 0.952, the voltage vector moves completely along the hexagon edges, and no additional fundamental control voltage can be synthesized without moving into the second subregion, OVM-II. It is known that in OVM-I, the angular velocity of the compensated and actual voltage reference vectors is both the same and constant for each fundamental period. Thus, output voltages higher than MI=0.952 cannot be generated in OVM-I.

When the MI is larger than 0.952, the second subregion OVM-II is reached, as represented by the annular region between the circle OVM-I and the outer circle OVM-II in FIG. 2, which corresponds to an MI of 1.0. In this region, a holding angle αh is introduced. To describe OVM-II operation, consider only the triangular hexagon sector 0 defined by the vertices V0, V1, & V2 in FIG. 2. If the control voltage angle α is less than the holding angle αh, the voltage vector is held at the V1 vertex. If a is larger than (π/3)−αh, the voltage vector is held at the V2 vertex. When the control voltage angle α is between αh and (π/3)−αh, the applied voltage vector magnitude is clamped to the hexagon edge between vertices V1 and V2 and the angle is manipulated to transition smoothly along the side of the hexagon HX between the V1 and V2 vertices. The holding angle αh increases from κ to π/6 as the MI increases from 0.952 to 1. To achieve OVM-II operation, the conventional method described here is extended to each of the hexagon sectors. When the MI is equal to 1, the applied voltage vector will always be one of the hexagon vertices, and will jump from vertex to adjacent vertex as the control voltage vector rotates. This is defined as six-step PWM operation. In six-step, only six switching events take place per fundamental period. This greatly reduces inverter switching losses and maximizes the available fundamental voltage that can be applied by the VSI.

With this conventional overmodulation algorithm, ideally, the switches of the VSI turn on or off exactly at the middle of each hexagon sector when operating in six-step. For example, the transition from the V1 vertex to the V2 vertex (i.e., 100→110 representing the Phase B voltage transition from low to high) happens exactly when crossing α=π/6 when in Sector 0. Similarly, the transition from vertex V4 to vertex V5 (i.e., Phase B voltage transitioning from high to low) occurs exactly at 7π/6 in Sector 3. This duty cycle is depicted in FIG. 3. In this ideal case, a balanced square voltage is applied to all three phases. However, since the control algorithm is generally implemented in a digital signal processor (DSP), the control is discretized and only executes at a prescribed rate (i.e., the PWM frequency). Therefore, in general, a new duty cycle can only be applied once per PWM period and the switches can only be turned on or off when a new PWM period occurs. Using these conventional methods, if the ratio between the PWM frequency and the fundamental control voltage frequency (i.e., the pulse ratio) is low (e.g., highspeed operation or low PWM frequency operation), then a large imbalance and phase shift can be observed in the six-step voltage waveform as shown by the offset square wave labeled "Discretized Six Step PWM" in FIG. 3. This phenomenon can critically affect the stability of a motor drive system.

Conventional Six-Step PWM

U.S. Pat. No. 9,419,549 (the '549 patent) to Yim et al., which issued on Aug. 16, 2016, discloses a predictive-based six-step control that overcomes the problem mentioned above. The disclosure of the '549 patent and the method disclosed therein is expressly incorporated herein by reference. An example of this technique is shown in FIG. 4. In this method, using ωe and the control voltage vector angle, α, of the current PWM period, the controller can predict if the control voltage vector will cross the middle of a hexagon sector within the next PWM period. If so, then, an intermediate duty cycle is inserted in the next PWM period using a sawtooth or inverted sawtooth PWM carrier waveform, as shown in FIG. 4. By using this method, the ideal six-step PWM waveform can theoretically be realized.

However, the method disclosed in the '549 patent only works when the motor control is already in the six-step mode. This is because the duty cycle calculation purely depends on the angle and frequency and because the PWM carrier waveform change is discontinuous. However, in general, a motor drive system must always transition smoothly from linear modulation, through the overmodulation region, and gradually into six-step operation by increasing the MI as described above. Directly applying this method when MI reaches 1 will inject a large voltage disturbance and cause a subsequent phase current transient.

There is a need for a smooth transition mechanism from OVM to the six-step region that can avoid the transient of this prior art approach. This mechanism should guarantee the ideal six-step PWM waveform and result in a seamless transition between the linear, overmodulation, and six-step regions to reduce or eliminate any current or voltage transient.

SUMMARY OF THE DISCLOSURE

To increase the overall efficiency and peak power, an electric propulsion system, which includes an electric motor and a voltage source inverter, is often required to work in the six-step pulse width modulation (PWM) mode. The present disclosure provides a method to achieve balanced six-step PWM while maintaining the desired voltage phase and ensuring a smooth transition between overmodulation and six-step operation. In one aspect, the method disclosed herein predicts the PWM sample for which the control voltage vector will cross the middle of each SVPWM hexagon sector. Then, based on the current voltage angle and duty cycle, as well as on an estimated future voltage angle and duty cycle, an average duty cycle is calculated and inserted. In addition, a PWM carrier waveform is selected to ensure the PWM pulses applied to each period result in continuous switching states.

In one aspect, the method calculates a modified duty cycle Dmod that is calculated by averaging the ideal control voltage over the whole PWM cycle as shown in following equation:

$$D_{mod} = \left| \frac{1}{\omega eTs} \right| \int_{\alpha o}^{\alpha o(k+1)} V(\alpha) d\alpha,$$

where V(α) is the ideal average voltage as a function of α, αo is the ideal voltage angle at the current sample and α(k+1) is the predicted next voltage angle. In accordance with one aspect of the present disclosure, this equation is simplified by approximating the change in voltage between αo and α(k+1) into the calculation of a geometric area of the voltage waveform between the vertices of the sector whose midpoint is being crossed by the control voltage vector. For each of the six sectors of the PWM voltage hexagon, when the control voltage vector is passing through the middle of a hexagon sector, a Dmod that represents the ideal average voltage in that sample can always be generated by the following Equation (7) for a rising slope or Equation (8) for a falling slope with a positive ωe, and Equation (9) for a rising slope and Equation (10) for a falling slope with a negative ωe:

$$D_{mod} = \frac{1}{\omega eTs}\bigg( (\min(\alpha o(k+1), V(n+1) - \alpha h) - \max(\alpha o, V(n) + \alpha h)) \times \quad (7)$$
$$\frac{(D_0(k+1) + D_0)}{2} + \max(\alpha o(k+1) - V(n+1) + \alpha h, 0)$$

$$D_{mod} = \frac{1}{\omega eTs}\bigg( (\min(\alpha o(k+1), V(n+1) - \alpha h) - \max(\alpha o, V(n) + \alpha h)) \times \quad (8)$$
$$\frac{(D_0(k+1) + D_0)}{2} + \max(-\alpha 0 + V(n) + \alpha h, 0)$$

$$D_{mod} = \frac{1}{-\omega eTs}\bigg( (\min(\alpha o, V(n) - \alpha h) - \max(\alpha o(k+1), V(n+1) + \alpha h)) \times \quad (9)$$
$$\frac{(D_0(k+1) + D_0)}{2} + \max(-\alpha o(k+1) + V(n+1) + \alpha h, 0)$$

$$D_{mod} = \quad (10)$$
$$\frac{1}{-\omega eTs}\bigg( (\min(\alpha o, V(n) - \alpha h) - \max(\alpha o(k+1), V(n+1) + \alpha h)) \times$$
$$\frac{(D_0(k+1) + D_0)}{2} + \max(\alpha o - V(n) + \alpha h, 0)$$

where V(n) is the angle of the first vertex of the sector and V(n+1) is the angle of the second vertex of the sector being crossed by the control voltage.

DESCRIPTION OF THE FIGURES

FIG. 1 is a graph of electric motor speed vs. torque, identifying motor operating regions.

FIG. 2 is a diagram of a conventional pulse width modulation voltage hexagon identifying the linear modulation region, two over-modulation regions and a six-step PWM region.

FIG. 3 is a graph of conventional six-step voltage waveform for a phase of a 3-phase motor.

FIG. 4 is a graph of six-step PWM with intermediate duty cycle insertion as disclosed in U.S. Pat. No. 9,419,549.

FIGS. 6A and 6B are ideal control voltage waveforms for one phase in sector 0 operating in the OVM-II and six-step regions, illustrating a rising duty cycle.

FIGS. 7A and 7B are ideal control voltage waveforms for one phase in sector 3 operating in the OVM-II and six-step regions, illustrating a falling duty cycle.

FIG. 14A is a graph of the current response of the closed loop model of FIG. 13, showing the transition from OVM to six-step regions according to a conventional VSI control without any duty cycle modification.

FIG. 14B is a graph of the current response of the closed loop model of FIG. 13, showing the transition from OVM to six-step regions implementing the duty cycle modification disclosed in the '549 patent.

FIG. 14C is a graph of the current response of the closed loop model of FIG. 13, showing the transition from OVM to six-step regions implementing the duty cycle modification. method of the present disclosure.

FIG. 15 is circuit diagram of a conventional voltage source inverter arrangement for a 3-phase electric machine.

DETAILED DESCRIPTION

The present disclosure provides a system and method that is implemented by an ideal average duty cycle calculation and a continuous carrier waveform determination mechanism. A phase delay compensation is also implemented to address phase delay caused by the nature of digital signal processors (DSPs) used in the motor control mechanism.

A. Phase Delay Compensation

Figure 5:
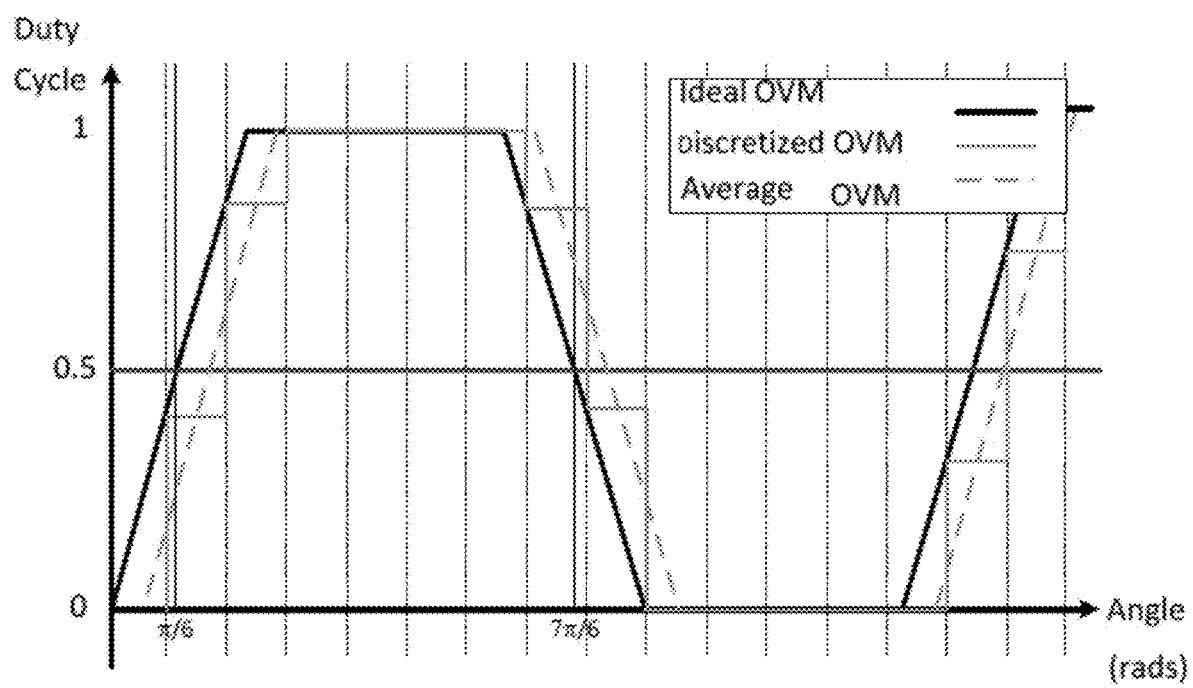
FIG. 5 is a graph of ideal, discretized and average control voltage waveforms for OVM-II operation of a voltage source inverter.

Compared to an ideal OVM-II control voltage waveform, after discretization, the actual average control voltage angle has a delay of approximately $0.5\,\omega_e Ts$, where Ts is the PWM period, as shown in FIG. 5. Also, because of the nature of a DSP, one PWM cycle can only generate pulses by duty cycles calculated in the previous cycle. This results in an additional $1.0\omega_e Ts$ delay. As a result, $1.5\omega_e Ts$ phase advance is always added to the control voltage angle as a compensation term. Further details of this phase delay compensation are disclosed in "A compensation method for time delay of full-digital synchronous frame current regulator of PWM AC drives." B. H. Bae, and S. K. Sul, IEEE Transactions on Industry Applications, vol. 39, no. 3 pp. 802-810, 2003, the entire disclosure of which is expressly incorporated herein by reference.

B. Ideal Average Duty Cycle Calculation

As noted above, to achieve an ideal six-step PWM, any sample in which the control voltage vector crosses the middle of any hexagon sector is critical. In this method, when it is identified that one of these samples is happening in OVM-II, a new duty cycle Dmod is calculated by averaging the ideal control voltage over the whole PWM cycle as shown in Equation (2) below:

$$D_{mod} = \left| \frac{1}{\omega_e Ts} \right| \int_{\alpha o}^{\alpha o(k+1)} V(\alpha) d\alpha \quad (2)$$

where $V(\alpha)$ is the ideal average voltage as a function of $\alpha$, $\alpha o$ is the ideal voltage angle at the current sector and $\alpha o(k+1)$ is the next ideal voltage at the current sector. The new duty cycle Dmod is then applied to the phase that transitions switching states between the adjacent hexagon vertices for the given hexagon sector (e.g., phase B in sector 0, phase A in sector 1, phase C in sector 2, etc.). It can be appreciated that when calculating the ideal average voltage, the $0.5\,\omega_e Ts$ delay caused by discretization no longer exists, and only the $1.0\omega_e Ts$ phase advance specific to the PWM delay of the DSP is added to the control voltage angle in Equation (2).

In an example, consider a phase B voltage with a positive $\omega_e$ at a sample instant in which the control voltage angle is crossing $\pi/6$. It is known that the range of $\alpha o$ is $[0, 7\pi/6]$ and the range of $\alpha o(k+1)$ is $(\pi/6, \pi/3)$. In OVM-II, the rising slope of phase B voltage can be approximated as a straight line as shown in FIG. 6A. Therefore, $$\int_{\alpha o}^{\alpha o(k+1)} V(\alpha) d\alpha$$

of Equation (2) can be simplified to calculating the area covered from $\alpha o$ to $\alpha o(k+1)$ using simple geometric calculations. Using this strategy, Equation (2) can be rewritten as Equation (3) below:

$$D_{mod} = \frac{1}{\omega_e Ts}\left(\left(\min\left(\alpha o(k+1), \frac{\pi}{3} - \alpha h\right) - \max(\alpha 0, \alpha h)\right) \times \frac{(D_0(k+1) + D_0)}{2} + \max(\alpha o(k+1) - \pi 3 + \alpha h, 0)\right) \quad (3)$$

where $\alpha h$ is the holding angle discussed above and Do is the unmodified duty cycle calculated using $V(\alpha)$ at $\alpha o$ and at $\alpha(k+1)$.

Equation (3) is valid through OVM-II, all the way up through six-step modulation such that no additional algorithm transition is necessary to achieve six-step operation. This is seen in FIG. 6B, when MI is 1, and $\alpha h$ is $\pi/6$. Equation (3) then becomes:

$$D_{mod} = \frac{1}{\omega_e Ts}\left(\left(\alpha o(k+1) - \frac{\pi}{6}\right)\right) \quad (4)$$

With an MI of 1, Dmod is thus equal to an intermediate duty cycle disclosed in the '549 patent, as discussed above.

A similar calculation can be derived for the falling slope as well. As FIG. 7A shows, for phase B voltage in Sector 3, the $\alpha o$ range is $[\pi, 7\pi/6]$ and the $\alpha o(k+1)$ range is $(7\pi/6, 4\pi/3)$. In this instance, Equation (2) can be rewritten as Equation (5) below:

$$D_{mod} = \frac{1}{\omega_e Ts}$$
$$\left(\left(\min\left(\alpha o(k+1), \frac{4\pi}{3} - \alpha h\right) - \max(\alpha o, \pi + \alpha h)\right) \times \frac{(D_0(k+1) + D_0)}{2} + \max(-\alpha o + \pi + \alpha h, 0)\right) \quad (5)$$

When MI is 1 (i.e., in the six-step mode, as illustrated in FIG. 7B), Equation (5) becomes:

$$D_{mod} = \frac{1}{\omega_e Ts}\left(\frac{7\pi}{6} - \alpha o\right) \quad (6)$$

Again, with an MI of 1, Dmod is equal to an intermediate duty cycle disclosed in the '549 patent.

For each of the six sectors, when the control voltage vector is passing through the middle of the hexagon sector, a Dmod that represents the ideal average voltage in that sample can always be generated in a form similar to Equation (3) for a rising slope or Equation (5) for a falling slope. In particular, the two equations can be written more generically in terms of the angles of the two vertices of the particular hexagon sector, as represented for a positive ωe by Equation (7) for a rising slope and Equation (8) for a falling slope. Similarly, for a negative ωe, Equation (9) is used for a rising slope and Equation (10) is used for a falling slope.

$$D_{mod} = \frac{1}{\omega eTs}((\min(\alpha o(k+1), V(n+1)-\alpha h) - \max(\alpha o, V(n)+\alpha h)) \times \frac{(D_0(k+1)+D_0)}{2} + \max \alpha o(k+1 - V(n+1)+\alpha h, 0) \quad (7)$$

$$D_{mod} = \frac{1}{\omega eTs}((\min(\alpha o(k+1), V(n+1)-\alpha h) - \max(\alpha o, V(n)+\alpha h)) \times \frac{(D_0(k+1)+D_0)}{2} + \max(-\alpha o + V(n)+\alpha h, 0) \quad (8)$$

$$D_{mod} = \frac{1}{-\omega eTs}((\min(\alpha o, V(n)-\alpha h) - \max(\alpha o(k+1), V(n+1)+\alpha h)) \times \frac{(D_0(k+1)+D_0)}{2} + \max(-\alpha o(k+1) + V(n+1)+\alpha h, 0) \quad (9)$$

$$D_{mod} = \frac{1}{-\omega eTs}((\min(\alpha o, V(n)-\alpha h) - \max(\alpha o(k+1), V(n+1)+\alpha h)) \times \frac{(D_0(k+1)+D_0)}{2} + \max(\alpha o - V(n)+\alpha h, 0) \quad (10)$$

where V(n) is the angle of the first vertex of the sector and V(n+1) is the angle of the second vertex of the sector being crossed by the control voltage. As reflected in the PWM voltage hexagon of FIG. 2, the vertex angles are 0-2π, π/3, 2π/3, π, 4π/3, and 5π/3.

When MI=1, or when the VSI control enters the six-step mode, the equations (7), (8), (9) and (10) resolve to Equations (11), (12), (13) and (14) respectively:

$$D_{mod} = \frac{1}{\omega eTs}((\alpha o(k+1) - V(\text{mid})) \quad (11)$$

$$D_{mod} = \frac{1}{\omega eTs}(V(\text{mid}) - \alpha 0) \quad (12)$$

$$D_{mod} = \frac{1}{-\omega eTs}(V(\text{mid}) - \alpha o(k+1)) \quad (13)$$

$$D_{mod} = \frac{1}{-\omega eTs}(\alpha o - V(\text{mid})) \quad (14)$$

where V(mid) is the angle in the middle of the sector. As reflected in FIG. 2, the mid-angles are π/6, π/2, 5π/6, 7π/6, 3π/2, and 11π/6.

The modified duty cycle Dmod is thus used to provide a duty command to a corresponding one or more of the switches of the VSI based on the sector. As a further benefit, these calculations for Dmod are appropriate from the start of OVM-II up through six-step operation such that no abrupt transients or discontinuities to the applied voltage magnitude and angle are made between linear modulation, up through OVM, and into six-step.

C. Implementation in a VSI Controller

Figure 8:
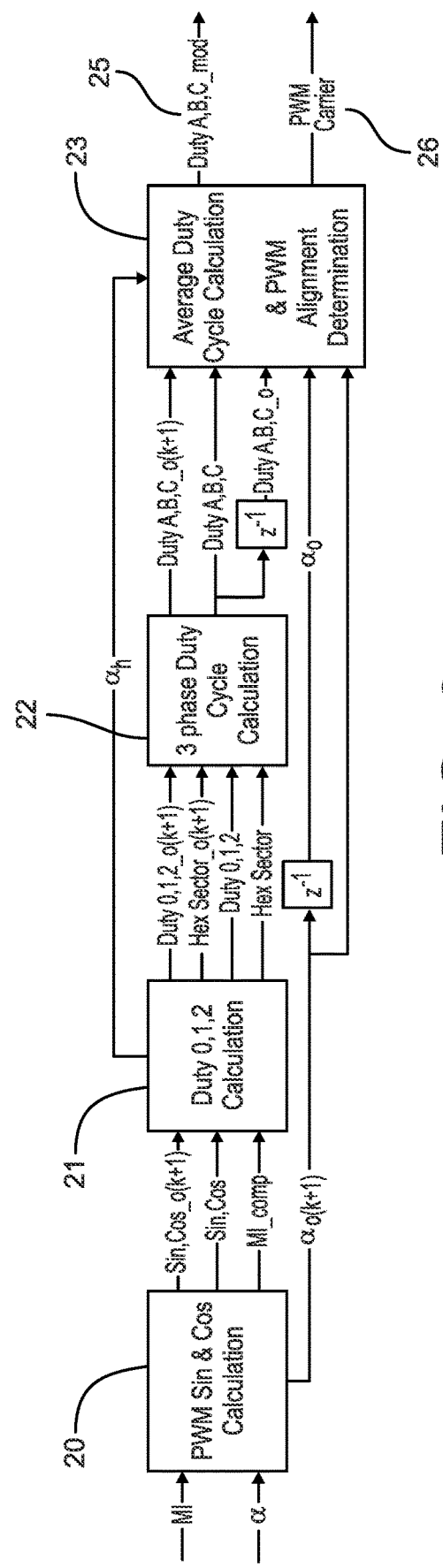
FIG. 8 is a block diagram of the architecture of a VSI controller operable to perform the method according to the present disclosure.
Figure 9:
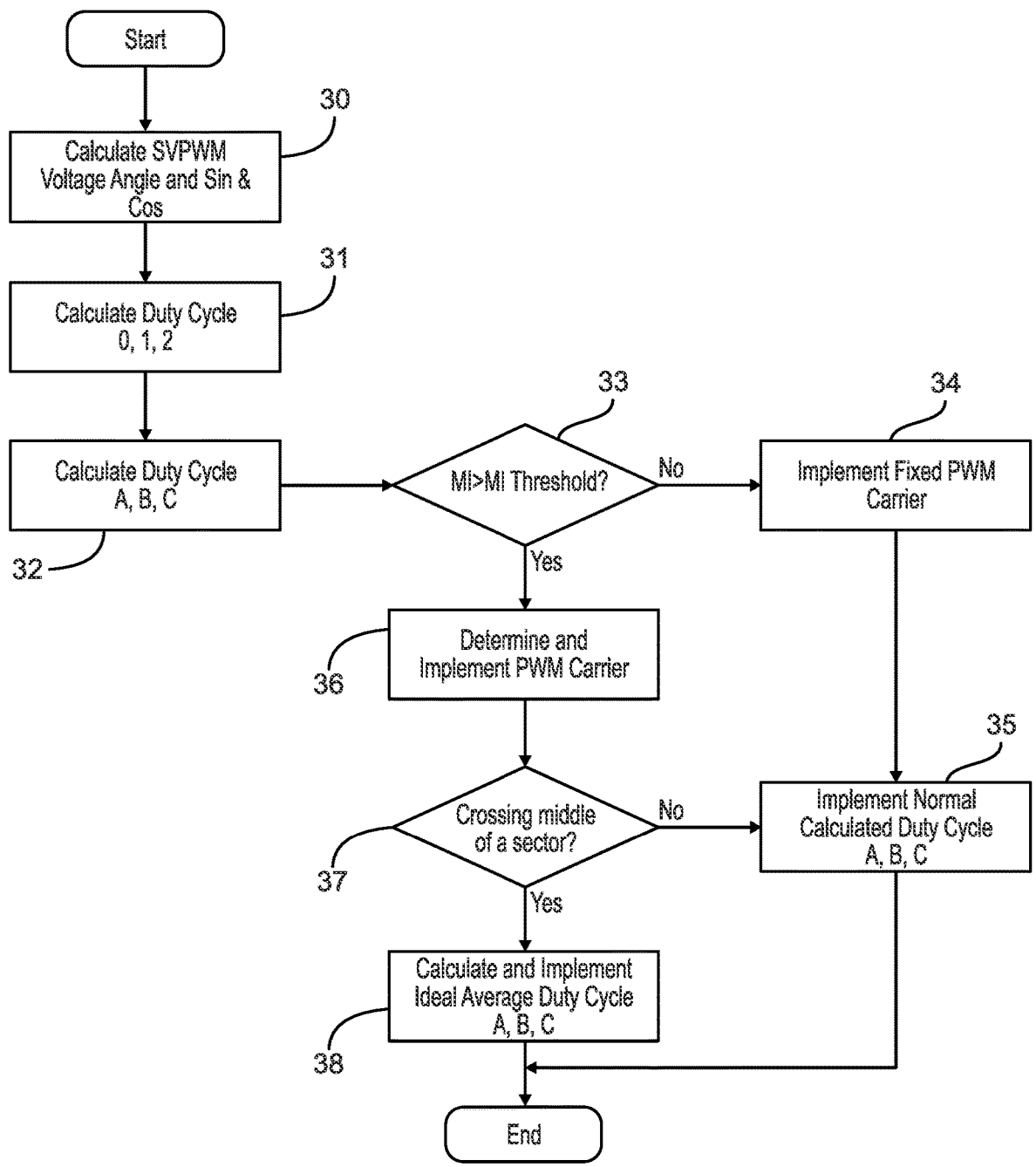
FIG. 9 is a flowchart of the steps of the method for controlling a VSI controller through the OVM-II region into the six-step region, according to the present disclosure.
Figure 11:
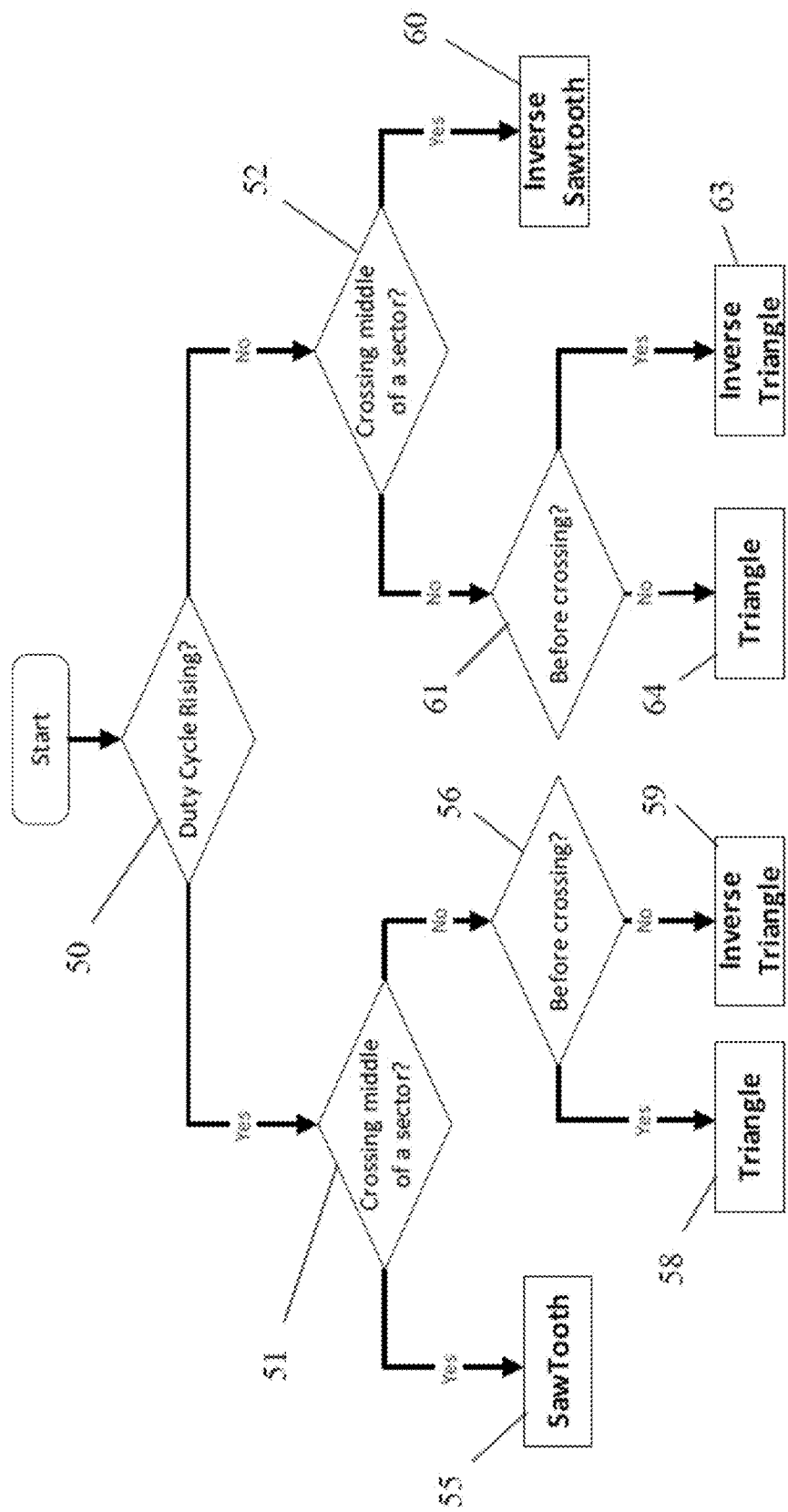
FIG. 11 is a flowchart of steps for selecting a carrier signal waveform according to the method disclosed herein.

The overall structure of an implementation of the present method is shown in FIG. 8 and in the flowchart of FIG. 9. In particular, FIG. 8 depicts the architecture of a VSI controller operable to control a VSI as a multi-phase PWM inverter circuit, such as the VSI controller 105 shown in FIG. 15. The VSI controller includes a computing device, which includes a computer or a microprocessor, configured and operable to execute software commands and programs, and which can include associated firmware. The modules 20-23 are software and/or firmware components within the computing device of the VSI controller that are configured and operable to implement the methods of the flowcharts of FIGS. 9 and 11. The controller includes a PWM Sin & Cos calculation module 20 that receives the modulation index (MI) and the control voltage angle (α) as inputs. The module 20 implements Step 30 (FIG. 9) to calculate the space vector PWM (SVPWM) voltage angle, and thus the orientation of the control voltage vector, and the sin and cosine signals for the linear modulation region. Outputs from the module 20 are the sin and cosine signals for the current control voltage angle (α) and the next voltage angle (α(k+1)), a compensated modulation index (MI_comp) and the next control voltage angle (α(k+1).

Three duty cycles (D0, D1, and D2) are calculated in module 21 according to method step 31 based on the outputs of the PWM Sin & Cos calculation module 20. The outputs from this module include the three duty cycle values at the current and next control voltage angle, and the hex sector of the PWM voltage hexagon (FIG. 2) for the current and next control voltage angle and the holding angle (αh). These outputs (except for the holding angle) are provided to the 3-phase duty cycle calculation module 22 in which the A, B and C duty cycles are calculated according to Step 32. In particular, the module 22 calculates the duty cycle values for the current and next control voltage angle (α and α(k+1)). These values are provided to the module 23 that performs Steps 33-38 of the method in the flowchart of FIG. 9.

The module 23 first calculates the current MI from command and sensor data received by the VSI controller, and then determines whether the current MI exceeds a pre-determined threshold (MI_threshold) according to Step 33 for implementing the duty cycle modification of the present disclosure. In one embodiment, MI_threshold corresponds to the MI value for entry into the OVM-II region, which in the illustrated embodiment is 0.952. If the MI does not exceed the threshold value, a fixed PWM carrier as PWM carrier output 26 is assigned in Step 34 and the normal duty cycle A, B, C, as calculated in Step 32 by module 22, is applied as output 25 in Step 35.

However, if the MI value exceeds MI_threshold, the module 23 determines an optimum PWM carrier in Step 36. Details of this step are described below in connection with the flowchart of FIG. 11. The conditional in Step 37 determines whether the modified duty cycle is to be applied, even when the MI is in the OVM-II range. In particular, the module 23 determines whether the control voltage vector is crossing the middle of the hex sector identified in Step 31 by module 21. If the control voltage vector is not crossing the middle of the hex sector, the normal calculated duty cycle is implemented in Step 35, albeit with an optimized PWM carrier as determined in Step 36.

On the other hand, if the control voltage vector is crossing the middle of the hex sector, the module 23 calculates and implements the ideal average duty cycle A, B, C in Step 38. In particular, the module 23 performs the calculations in Equations (9)-(12) above, depending on whether the phase voltage has a rising slope (Equation 9 or 11) or a falling slope (Equation 10 or 12). The outputs of the module 23 are the optimized PWM carrier 26 and the modified duty cycle 25, or Dmod in Equations (9)-(12).

D. PWM Alignment Mode Determination

Figure 10:
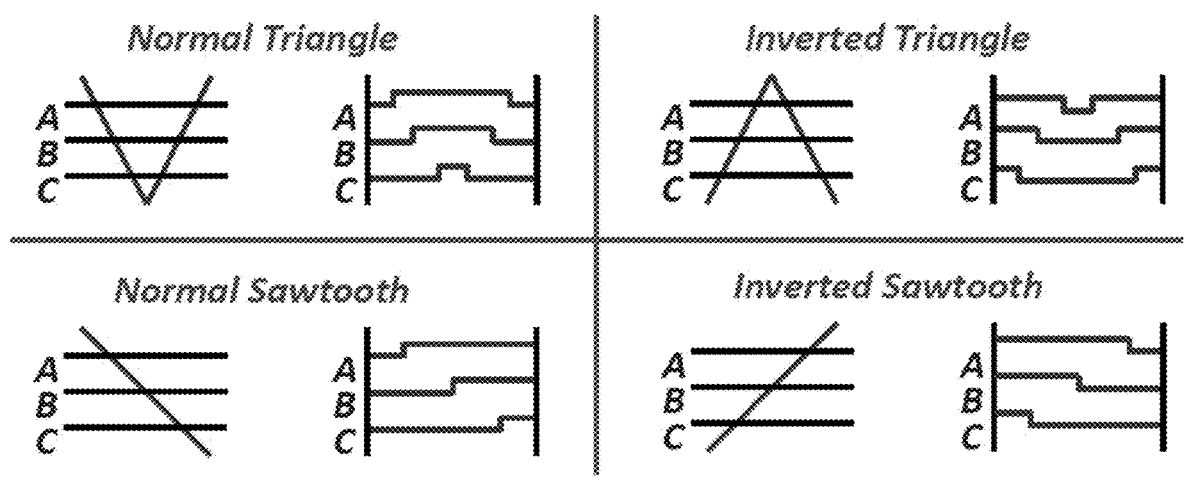
FIG. 10 includes diagrams representing four PWM carrier signal waveforms.

As explained above, when the MI is in the OVM-II region, an optimized PWM carrier is determined and implanted by the module 23 in Step 36. It is understood that the PWM carrier waveform determines when the VSI switches (such as switches 112, 114, 122, 124, 132, 134 in the exemplary system of FIG. 15) are activated. An improper PWM carrier can cause the switches to be activated in the wrong sequence, cause multiple switches to be actuated at the same time, or cause a switch to be activated or de-activated too quickly. In order to address this potential problem, four different PWM carriers, shown in FIG. 10, are introduced to ensure continuous PWM switching states are achieved. It is contemplated that the PWM carrier waveforms will change as the MI progresses through the OVM-II region into six-step PWM.

During OVM-II, in each hexagon sector, there is one and only one phase duty cycle increasing from 0 to 1, or decreasing from 1 to 0. The appropriate carrier waveform is determined according to the steps show in the flowchart of FIG. 11. In the first step 50, a determination is made as to whether the duty cycle is rising, or more specifically, whether the current duty cycle is 0 or is increasing from 0 to 1 based on the predicted value of the next sample. In each branch of the flowchart, the next determination in steps 51, 52 is whether the control voltage vector is passing through the middle of a hexagon sector. In the rising duty cycle branch, the sawtooth carrier waveform shown in FIG. 10 is selected in step 55 if the two conditionals 50, 51 are answered in the affirmative. For a rising duty cycle that is not crossing in the middle of a sector, the waveform depends on whether the control voltage vector is positioned before or after the middle of the sector, as determined in step 56. If before the middle, the triangle waveform of FIG. 10 is selected in step 58, and if after, the inverse triangle is selected in step 59. In the falling duty cycle branch, the inverse sawtooth carrier waveform is selected in step 60 if the conditional 50 is answered in the negative and the conditional 52 is answered in the affirmative. If conditional 52 is answered in the negative, the waveform depends on whether the control voltage vector is positioned before or after the middle of the sector, as determined in step 61. If before, the inverse triangle waveform is selected in step 63, and if after, the triangle waveform is selected in step 64.

With the implementation of this PWM alignment method, in the OVM-II region, a continuous carrier is ensured and discontinuous switching states can be avoided. Additionally, a balanced six-step waveform with no phase shift can be guaranteed during six-step operation. Finally, no control strategy transition is required between OVM and six-step because the Steps 36-38 can be applied in the six-step PWM control. As noted above, the Equations (7)-(10) resolve to Equations (11)-(14), respectively, when MI=1.0. Equations (11)-(14) correspond to the intermediate duty cycles disclosed in the '549 patent for optimized performance in six-step PWM control operation.

E. Simulations

Figure 12A:
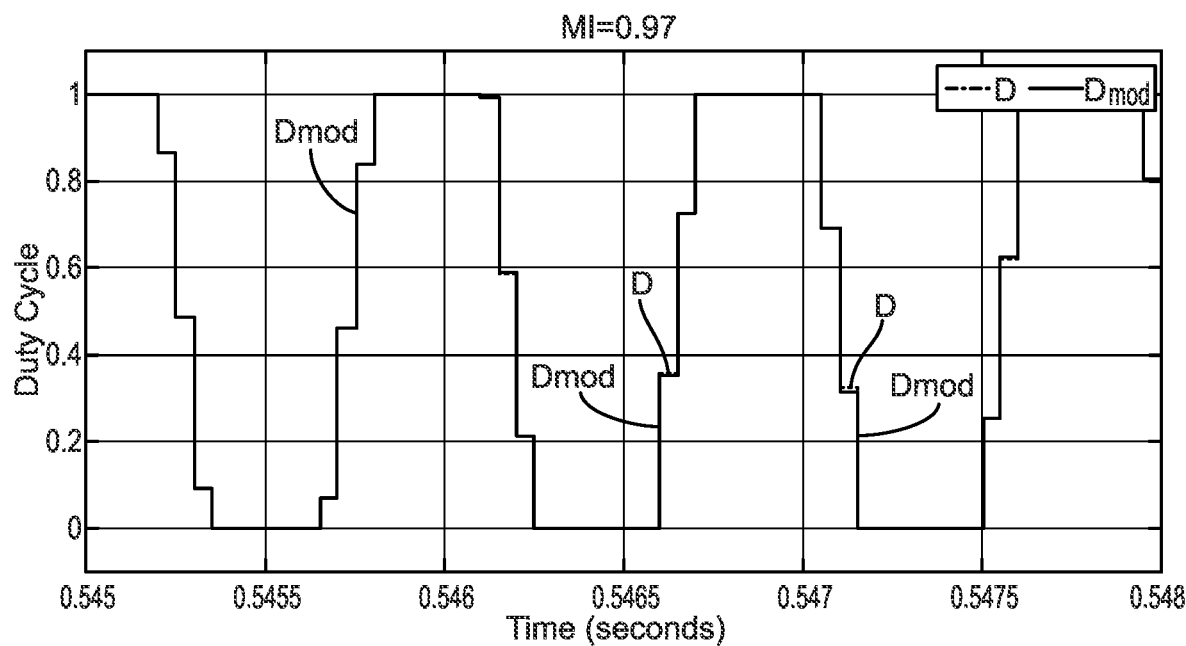
FIG. 12A-C are graphs at three modulation indices (MIs) showing the difference between a normal duty cycle, D, and a modified duty cycle, Dmod, generated using the method disclosed herein.
Figure 12B:
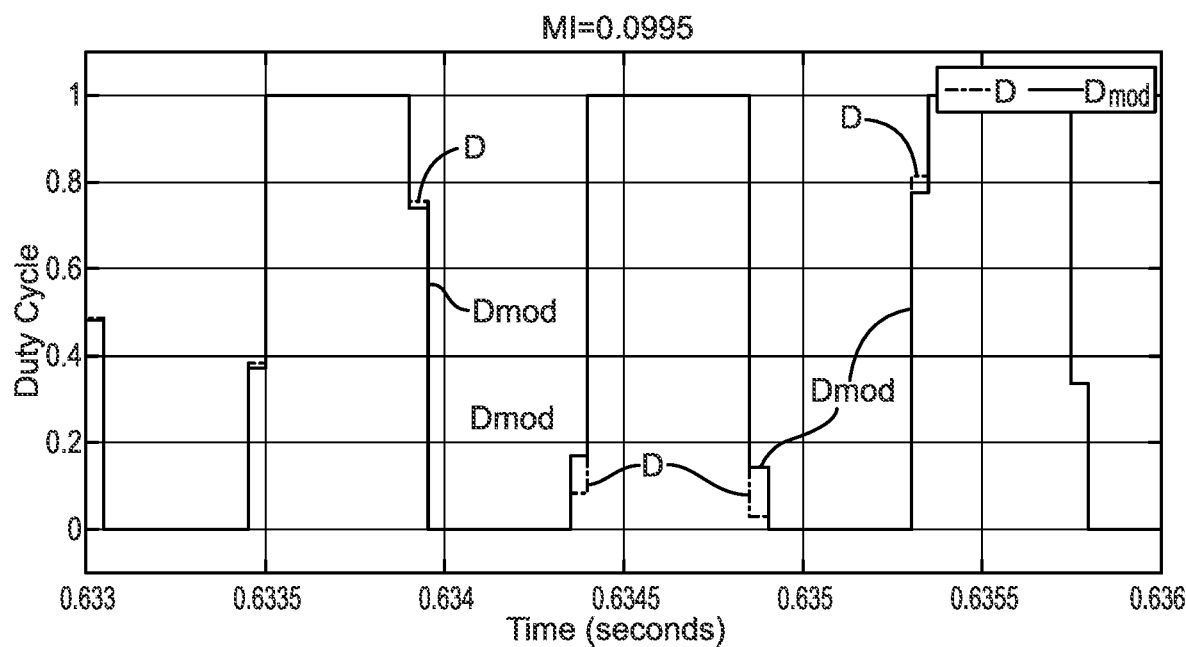
Figure 12C:
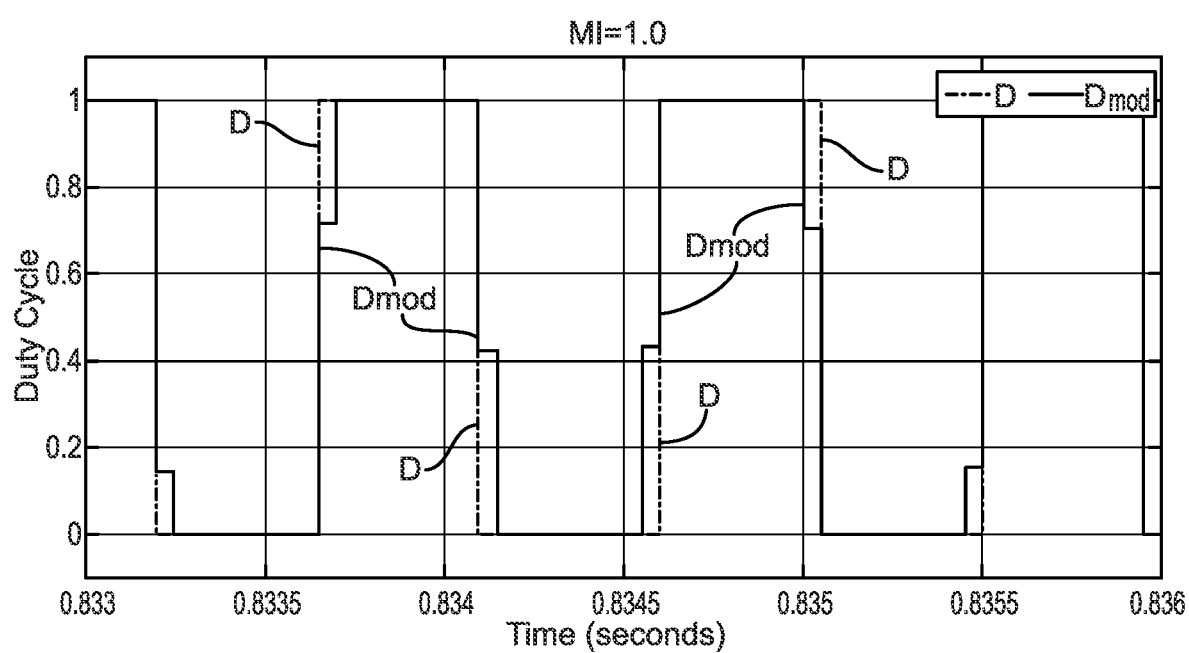

In one simulation, an open-loop model controls a 3-phase inverter generating voltage into an inductive load. During the simulation, MI is gradually increased from 0.952 up to 1, and $\omega e=2188\pi$ such that the pulse ratio is around 18. In OVM, when the MI is relatively low, the modified duty cycle Dmod is almost equal to the original duty cycle D. In this simulation, D is the duty cycle value directly generated by the conventional OVM strategy before any subsequent modifications. As MI increases to about 0.97, as shown in FIG. 12A, and then to about 0.995, as shown in FIG. 12B, the average voltage calculation function starts to modify the Dmod more significantly to provide more accurate voltage in the sample instant passing through the middle of a hexagon sector. The modified duty cycle Dmod at MI of 1.0 provides high quality six-step PWM, as reflected in the graph of FIG. 12C. It can be noted that the method disclosed herein provides a smooth transition between linear modulation at relatively low MIs, through OVM-I into OVM-II, with the modified duty cycle changing gradually with changing MI values.

Figure 13:
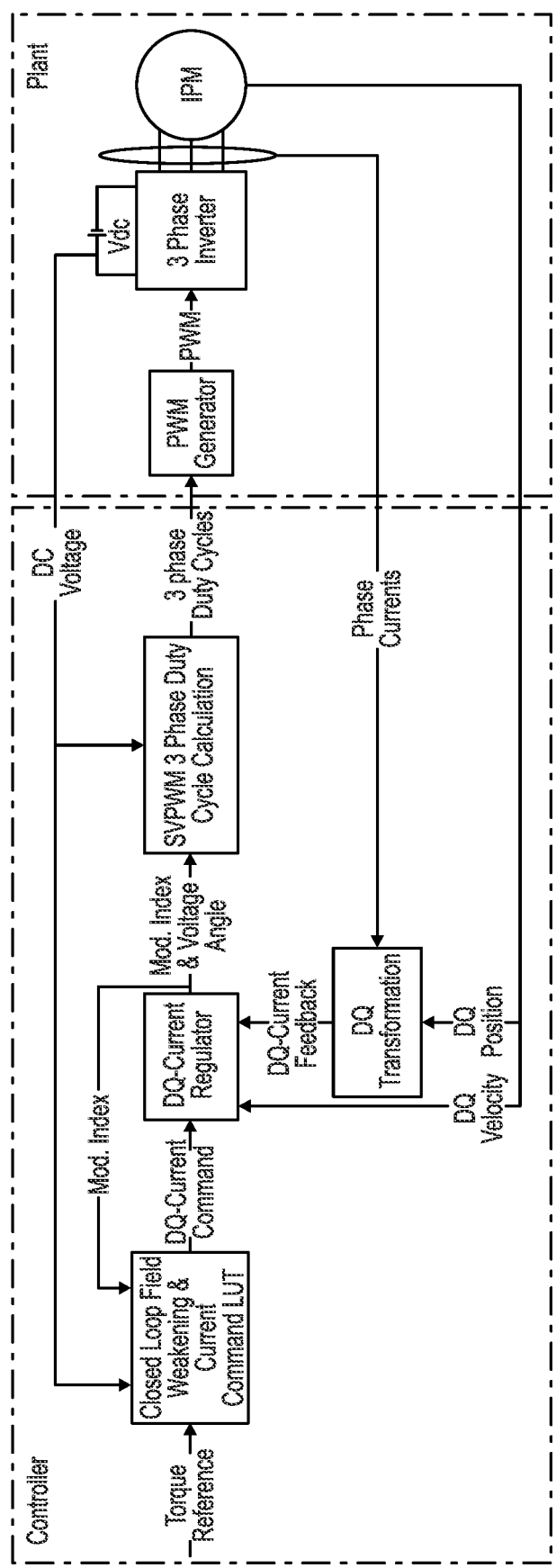
FIG. 13 is block diagram of a closed loop model for demonstrating the operation of the method disclosed herein.

In another simulation, a closed loop model is based on a 48V drive for a hybrid electric vehicle application, as is depicted in FIG. 13. In this model, an IPM motor drive system is controlled to operate from linear modulation up to six-step. The electric speed of motor is $2755\pi$, so the pulse ratio is around 14. In this simulation, the method is activated when MI>0.952 to generate the modified duty cycle Dmod. The 3-phase current response for the three transitions from OVM to six-step is shown in the graphs of FIG. 14A-C. In the first graph of FIG. 14A, the transition occurs without any duty cycle modification, leading to unsteady 3-phase current waveforms. In the graph of FIG. 14B, the transition implements the intermediate duty cycle modification disclosed in the '549 patent, producing similarly unsteady current waveforms. On the other hand, implementing the method disclosed herein generates a much smoother transition from OVM into six-step PWM as reflected in the graph of FIG. 14C.

While the invention has been described with reference to exemplary embodiments, it will be understood by those skilled in the art that other implementations and adaptations are possible. For example, various changes may be made and equivalent elements may be substituted for elements thereof without departing from the scope of the invention. In addition to the foregoing examples, many modifications may be made to adapt a particular situation or material to the teachings of the invention without departing from the essential scope thereof. Also, there are advantages to individual advancements described herein that may be obtained without incorporating other aspects described herein. Therefore, it is intended that the invention not be limited to the particular embodiment disclosed for carrying out this invention, but that the invention will include all embodiments falling within the scope of the appended claims.

What is claimed is:

1. A controller for controlling a voltage source inverter (VSI) electrically operatively connected between a DC voltage source and a multi-phase AC electric machine, the VSI including a plurality of selectively controllable switches that are activatable and de-activatable according to a space vector pulse width modulated (SVPWM) duty cycle with a rotating control voltage within an inverter voltage limit hexagon defining six sectors, the controller comprising a computing device and software, the computing device and software configured and operable to perform the following steps:

calculating a normal duty cycle for each phase of the AC electric machine;

determining the modulation index (MI) and comparing the MI to a predetermined threshold value MI_threshold;

if MI is less than or equal to MI_threshold, control one or more of the plurality of switches according to the normal duty cycle; and if MI is greater than MI_threshold;

calculating a modified duty cycle based on an average ideal control voltage over a full PWM cycle; and then controlling the one or more of the plurality of switches according to the modified duty cycle.

2. The controller of claim 1, wherein the computing device and software is configured and operable to perform the following steps if MI is greater than MI_threshold:
   determining whether the control voltage vector is crossing the middle of a sector;
   if so, then controlling the one or more of the plurality of switches according to the modified duty cycle; and
   if not, then controlling the one or more of the plurality of switches according to the normal duty cycle.

3. The controller of claim 1, wherein for the step of calculating a modified duty cycle the computing device and software is configured and operable to perform the following steps:
   determining the voltage hexagon sector being crossed by the rotating control voltage vector, and then,
   if the slope of the normal duty cycle is rising in the sector with a positive ωe, the calculation is according to the equation $$D_{mod} = \frac{1}{\omega e T s}$$

$$((\min(\alpha o(k+1), V(n+1) - \alpha h) - \max(\alpha o, V(n) + \alpha h)) \times \frac{(D_0(k+1) + D_0)}{2} + \max(\alpha o(k+1) - V(n+1) + \alpha h, 0), \text{ and}$$

if the slope of the normal duty cycle is falling in the sector with a positive ωe, the calculation is according to the equation $$D_{mod} = \frac{1}{\omega e T s}$$

$$((\min(\alpha o(k+1), V(n+1) - \alpha h) - \max(\alpha o, V(n) + \alpha h)) \times \frac{(D_0(k+1) + D_0)}{2} + \max(-\alpha o + V(n) + \alpha h, 0),$$

if the slope of the normal duty cycle is rising in the sector with a negative ωe, the calculation is according to the equation $$D_{mod} = \frac{1}{-\omega e T s}$$

$$((\min(\alpha o, V(n) - \alpha h) - \max(\alpha o(k+1), V(n+1) + \alpha h)) \times \frac{(D_0(k+1) + D_0)}{2} + \max(-\alpha o(k+1) + V(n+1) + \alpha h, 0), \text{ and}$$

if the slope of the normal duty cycle is falling in the sector with a negative ωe, the calculation is according to the equation $$D_{mod} = \frac{1}{-\omega e T s}$$

$$((\min(\alpha o, V(n) - \alpha h) - \max(\alpha o(k+1), V(n+1) + \alpha h)) \times \frac{(D_0(k+1) + D_0)}{2} + \max(\alpha o - V(n) + \alpha h, 0),$$

in which αo is the current control voltage angle, αh is the holding angle of the SVPWM duty cycle for the sector, ωe is the electric speed, Do is the normal duty cycle, V(n) is the angle of the first vertex of the voltage hexagon sector being crossed and V(n+1) is the angle of the next vertex of the voltage hexagon sector.

4. The controller of claim 1, the computing device and software is configured and operable to perform the step of determining a carrier waveform for the duty cycle if MI is greater than MI_threshold based on where the control voltage vector is relative to the middle of the sector.

5. The controller of claim 4, wherein for the step of determining the carrier waveform the computing device and software is configured and operable to select from a sawtooth, inverse sawtooth, triangle and inverse triangle waveform based on where the control voltage vector is relative to the middle of the sector.

6. The controller of claim 4, wherein for the step of determining the carrier waveform the computing device and software is configured and operable to base the selection of the waveform on whether the slope of the normal duty cycle is rising or falling.

7. The controller of claim 6, wherein for the step of determining the carrier waveform the computing device and software is configured and operable to perform the steps of selecting from a sawtooth, inverse sawtooth, triangle and inverse triangle waveform based on where the control voltage vector is relative to the middle of the sector.

8. The controller of claim 7, wherein for the step of determining the carrier waveform the computing device and software is configured and operable to perform the steps of:
   selecting a sawtooth or an inverse sawtooth waveform if the control voltage vector is crossing the middle of the sector; and
   otherwise selecting a triangle or an inverse triangle waveform.

9. A controller for controlling a voltage source inverter (VSI) electrically operatively connected between a DC voltage source and a multi-phase AC electric machine as control voltage demand for the electric machine increases, the VSI including a plurality of selectively controllable switches that are activatable and de-activatable according to a space vector pulse width modulated (SVPWM) duty cycle with a rotating control voltage within an inverter voltage limit hexagon defining six sectors, the controller comprising a computing device and software, the computing device and software configured and operable to perform the following steps:
   calculating a modulation index (MI) as a function of the increasing control voltage;
   determining when the MI enters the over-modulation (OVM) region;
   when the MI is in the OVM-I region, calculating a normal duty cycle for each phase of the AC electric machine and then controlling the one or more of the plurality of switches according to the normal duty cycle; and
   when the MI enters an OVM-II region, calculating a modified duty cycle based on an average ideal control voltage over a full PWM cycle and then controlling the one or more of the plurality of switches according to the modified duty cycle.

10. The controller of claim 9, wherein the computing device and software is configured and operable to:
   operate the VSI in a six-step mode when the MI=1.0; and
   to apply the modified duty cycle to control the one or more of the plurality of switches when the VSI is operated in a six-step mode.

11. A method for controlling a voltage source inverter (VSI) electrically operatively connected between a DC voltage source and a multi-phase AC electric machine, the VSI including a plurality of selectively controllable switches that are activatable and de-activatable according to a space vector pulse width modulated (SVPWM) duty cycle with a rotating control voltage vector within an inverter voltage limit hexagon defining six sectors, the method comprising:
   calculating a normal duty cycle for each phase of the AC electric machine;

determining the modulation index (MI) and comparing the MI to a predetermined threshold value MI_threshold;

if MI is less than or equal to MI_threshold, control one or more of the plurality of switches according to the normal duty cycle; and if MI is greater than MI_threshold;
  calculating a modified duty cycle based on an average ideal control voltage over a full PWM cycle; and then
  controlling the one or more of the plurality of switches according to the modified duty cycle.

12. The method of claim 11, wherein if MI is greater than MI_threshold:
  determining whether the control voltage vector is crossing the middle of a voltage hexagon sector;
  if so, then controlling the one or more of the plurality of switches according to the modified duty cycle; and
  if not, then controlling the one or more of the plurality of switches according to the normal duty cycle.

13. The method of claim 11, wherein in the step of calculating a modified duty cycle includes:
  determining the voltage hexagon sector being crossed by the rotating control voltage vector, and then,
  if the slope of the normal duty cycle is rising in the sector with a positive $\omega e$, the calculation is according to the equation $$D_{mod} = \frac{1}{\omega eTs}$$
$$((\min(\alpha o(k+1), V(n+1) - \alpha h) - \max(\alpha o, V(n) + \alpha h)) \times \frac{(D_0(k+1) + D_0)}{2} +$$
$$\max(\alpha o(k+1) - V(n+1) + \alpha h, 0),$$

if the slope of the normal duty cycle is falling in the sector with a positive $\omega e$, the calculation is according to the equation $$D_{mod} = \frac{1}{\omega eTs}$$
$$((\min(\alpha o(k+1), V(n+1) - \alpha h) - \max(\alpha o, V(n) + \alpha h)) \times \frac{(D_0(k+1) + D_0)}{2} +$$
$$\max(-\alpha o + V(n) + \alpha h, 0),$$

if the slope of the normal duty cycle is rising in the sector with a negative $\omega e$, the calculation is according to the equation $$D_{mod} = \frac{1}{-\omega eTs}$$
$$((\min(\alpha o, V(n) - \alpha h) - \max(\alpha o(k+1), V(n+1) + \alpha h)) \times \frac{(D_0(k+1) + D_0)}{2} +$$
$$\max(-\alpha o(k+1) + V(n+1) + \alpha h, 0), \text{ and}$$

if the slope of the normal duty cycle is falling in the sector with a negative $\omega e$, the calculation is according to the equation $$D_{mod} = \frac{1}{-\omega eTs}$$
$$((\min(\alpha o, V(n) - \alpha h) - \max(\alpha o(k+1), V(n+1) + \alpha h)) \times \frac{(D_0(k+1) + D_0)}{2} +$$
$$\max(\alpha o - V(n) + \alpha h, 0),$$

in which $\alpha o$ is the current control voltage angle, $\alpha h$ is the holding angle of the SVPWM duty cycle for the sector, $\omega e$ is the electric speed, $D_0$ is the normal duty cycle, $V(n)$ is the angle of the first vertex of the voltage hexagon sector being crossed and $V(n+1)$ is the angle of the next vertex of the voltage hexagon sector.

14. The method of claim 11, further comprising determining a carrier waveform for the duty cycle if MI is greater than MI_threshold based on where the control voltage vector is relative to the middle of the sector.

15. The method of claim 14, wherein the step of determining the carrier waveform includes selecting from a sawtooth, inverse sawtooth, triangle and inverse triangle waveform based on where the control voltage vector is relative to the middle of the sector.

16. The method of claim 14, wherein the step of determining the carrier waveform is also based on whether the slope of the normal duty cycle is rising or falling.

17. The method of claim 16, wherein the step of determining the carrier waveform includes selecting from a sawtooth, inverse sawtooth, triangle and inverse triangle waveform based on where the control voltage vector is relative to the middle of the sector.

18. The method of claim 17, wherein the step of determining the carrier waveform includes:
  selecting a sawtooth or an inverse sawtooth waveform if the control voltage vector is crossing the middle of the sector; and
  otherwise selecting a triangle or an inverse triangle waveform.

19. The method of claim 18, wherein the step of selecting a triangle or an inverse triangle waveform includes:
  determining if the control voltage vector is positioned before or after the middle of the sector;
  when the duty cycle is rising, selecting the triangle waveform if the control voltage vector is before and selecting the inverse triangle waveform if the control voltage vector is after; and
  when the duty cycle is falling, selecting the inverse triangle waveform if the control voltage vector is before and selecting the triangle waveform if the control voltage vector is after.

20. The method of claim 16, wherein the step of determining the carrier waveform includes:
  selecting a sawtooth waveform if the normal duty cycle is rising; and
  selecting an inverse sawtooth waveform if the normal duty cycle is falling.

\* \* \* \* \*